（12） United States Patent
Cardone et al.

(10) Patent No.: US 8,005,986 B2
(45) Date of Patent: *Aug. 23, 2011

(54) CONSISTENT SNAPSHOTS OF DYNAMIC HETEROGENEOUSLY MANAGED DATA

(75) Inventors: Richard J. Cardone, Mahopac, NY (US); Reto Hermann, Buttikon (CH); Andreas Schade, Adliswil (CH); William F. Trautman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/543,168

(22) Filed: Aug. 18, 2009

(65) Prior Publication Data

US 2009/0307373 A1 Dec. 10, 2009

Related U.S. Application Data

(60) Division of application No. 12/128,227, filed on May 28, 2008, which is a continuation of application No. 10/918,070, filed on Aug. 13, 2004, now Pat. No. 7,392,324.

(51) Int. Cl.
*G06F 15/177* (2006.01)

(52) U.S. Cl. ......... 709/238; 709/203; 709/220; 717/174

(58) Field of Classification Search .................. 709/203, 709/206, 227, 228; 719/317
See application file for complete search history.

(56) References Cited

U.S. PATENT DOCUMENTS

| 5,403,639 | A  | * | 4/1995  | Belsan et al. ................ 1/1 |
| 6,662,198 | B2 | * | 12/2003 | Satyanarayanan et al. ........... 1/1 |
| 6,883,101 | B1 | * | 4/2005  | Fox et al. ................... 726/25 |
| 7,392,324 | B2 | * | 6/2008  | Cardone et al. ............... 709/238 |
| 7,610,588 | B1 | * | 10/2009 | Hager et al. .................. 719/317 |

OTHER PUBLICATIONS

Tokyo Institute of Techology; Incremental Zone Transfer in DNS; updates: 1035; rfc 1995; 14 pages.

* cited by examiner

*Primary Examiner* — Khanh Q Dinh
(74) *Attorney, Agent, or Firm* — Tutunjian & Bitetto, P.C.; Anne V. Dougherty, Esq.

(57) ABSTRACT

A system and method for providing a consistent view of data stored therein, which can change dynamically in an uncoordinated way, includes a client program and a snapshot server program. The snapshot server program permits one or more client programs to request snapshots of data from the snapshot server program such that the data included in or referenced by a snapshot originates from one or more host server programs and the data is accessible to the snapshot server program, but is managed independently of the snapshot server program.

16 Claims, 11 Drawing Sheets

CONSISTENT SNAPSHOTS OF DYNAMIC HETEROGENEOUSLY MANAGED DATA

RELATED APPLICATION INFORMATION

This application is a Divisional application of co-pending U.S. patent application Ser. No. 12/128,227 filed on May 28, 2008, which is a Continuation of U.S. patent application Ser. No. 10/918,070 filed Aug. 13, 2004 now U.S. Pat. No. 7,392,324 issued on Jun. 17, 2008, both incorporated herein by reference in their entirety.

BACKGROUND

1. Technical Field

Exemplary embodiments presented herein relate to distributed computing, and more particularly to providing a consistent view of data that resides on a network and that can change dynamically in an uncoordinated way.

2. Description of the Related Art

The following is a survey of concepts, systems and protocols used in the prior art to provide background for the present invention.

Domain Name System (DNS) is an instance of a distributed database enabling local control of segments of the overall database and global access to the aggregate data in a client-server scheme. The servers in a DNS system are called name servers; the clients are called resolvers.

Name servers are delegated responsibility for a zone, the part of the total data they are controlling authoritatively. To increase availability of DNS data and achieve scalability, DNS deploys primary and secondary master name servers. The primary master loads the data the primary master is responsible for from files, while the secondary master obtains and updates data from the primary master in an action called zone transfer.

Request for Comments document for Tokyo Institute of Technology in the category of Standards Track (*RFC* 1995) describes an incremental zone transfer protocol, which permits a secondary master to pull only those zone changes it needs to synchronize its copy of the zone with the source maintained by the primary master. Versions of zone data are identified by serial numbers. These numbers are exchanged as part of the SOA (start of authority) record.

If the serial number for the zone at the primary master is greater than at the requesting secondary master, the transfer includes only those changes to RRs (resource records) for each incremental version of the zone. The primary master must maintain a history of incremental zone changes to be able to compute the proper set of RR updates between the current version and the version of the requesting secondary master.

Control Version System (CVS) is a version control system that supports the recording of file change histories. CVS maintains a repository of all files under version control. CVS users may retrieve (check out) versions of files, store them in a working directory in the local file system, modify the copies, and commit (check in) the modified files to the repository. The repository is physically separate from the working directory. The repository may reside on the local machine or on a remote CVS server.

Rather than storing all different versions of a file, the repository stores all versions in a single file and only records the differences between versions. CVS assigns a version number is of each committed version of a file. A particular version of a file may be extracted from the repository using either its version number or the date when it was checked in.

CVS supports team programming by insulating developers from each other. Developers may simultaneously edit local copies of the same file. CVS merges the work when the local copies are checked in.

OSGi's (Open Services Gateway Initiative) primary goal is to define and foster rapid adoption of open specifications for the delivery of managed broadband services to networks in homes, cars and other environments. The OSGi Service Platform is a JAVA™ framework for developing remotely deployed service applications. OSGi provides life cycle management for services installed on the platform—services can be installed, started, stopped, updated and removed without disturbing other services within the platform. Services can locate each other and advertise their services through the registry. A service can also request that the framework notify it when another service becomes available or another state change occurs. Version management is provided by the platform, and the platform itself can be controlled remotely.

OSGi SPR3 defines specifications and JAVA™ application programming interfaces (APIs) that define the core functions of the platform and an application lifecycle, and provide a service registry, package and version management, and remote management ability. These APIs are then implemented by OSGi Service Platform implementations such as SMF (Service Management Framework). SMF is IBM®'s OSGi implementation; SMF 3.5 implements OSGi Service Platform Release 3 (SPR3).

OSGi (and SMF) applications are called bundles. A bundle is a JAR file containing the resources to implement services, and a manifest file with bundle information. A bundle can also act as a library, and only export JAVA™ packages. Bundles are stored in a SMF bundle server and are deployed from the server to the SMF runtime. The SMF platform can install, update, and uninstall bundles dynamically. Code within bundles can execute searches to find services registered by other bundles. The bundle lifecycle contains six states: installed, resolved, starting, active, stopping, and uninstalled.

The SMF bundle server maintains a bundle catalog, and can be shared by multiple developers. The SMF bundle server interacts with a management agent for the SMF runtime, and provides bundle "snapshots" and dependency checking for loading bundles. Snapshots are a way to store the current state of the runtime for later use, such as during recovery or reset. A typical use for snapshots is for developers to load all of the bundles needed on a particular target runtime and then to save the snapshot so that they can test different configurations and still be able to return to the previous state.

The bundle developer uses the Safe Bundle Install Protocol to install bundles into the runtime. The runtime provide the SMF bundle server with its configuration data and a list of currently installed bundles. The bundle server then determines the correct version of a bundle, resolves the bundle before it is downloaded by determining whether all the required packages and services are available in the runtime, and provides a list of prerequisite bundles needed by the runtime.

Although SMF uses bundle snapshots, they are unrelated to bundle updates, but store the current state of the SMF Runtime. Thus, using the snapshot, a particular runtime environment can be restored. Particular bundles are updated by downloading the latest version from the bundle server upon user request.

Tightly-Integrated Client/Server Systems are systems in which a client program executes a private protocol with a server program which requires tight integration between these two communicating components. Typically, the client and server components are developed together and are intended to run together. For performance or other reasons, data that resides on the server is often replicated on the client as part of the client/server protocol. Similarly, for recovery or other reasons, data that resides on the client may be replicated on the server.

LOTUS NOTES® is an example of a client/server system in which the protocol between the client and server components implements data replication. In LOTUS NOTES®, databases that reside on either the client or the server can be replicated elsewhere on the network. For example, a person's e-mail database usually resides on a "Notes" server and is often replicated on the "Notes" client. This replication allows fast access to e-mail documents on the client platform, whether or not the client is connected to the network.

Distributed server systems and distributed, multiple-server systems often require closely coordinated server execution and explicitly synchronized server data. Distributed Database Management Systems (DDBMS), for example, replicate databases according to well-defined protocols for performance and availability reasons.

Standard web browsers, such as INTERNET EXPLORER® or MOZILLA™, allow web applications to store data in cookies that reside on the client machine that runs the browser. These cookies usually store a small amount of application data, such as user preferences or session identifiers, which the browser will send on future requests to the application server.

SUMMARY OF THE INVENTION

The present invention provides a number of differences from the prior art concepts, systems, and protocols. For example, there are a number of differences between incremental zone transfer of the prior art and the present invention. Unlike the primary master in DNS, the snapshot server in present invention operates as an intermediary between heterogeneous and distributed data sources and the client. Snapshot updates do not occur on a regular basis but only as requested by the client. The snapshot server does not need to maintain the history of changes; rather, the digests submitted by the requesting client enable the snapshot server to compute the difference between the client's copy of the data and the current source data. A further difference is that the client can narrow the scope of data for which an update is requested.

In addition, there are differences between CVS and the present invention. The snapshot server in the present invention operates as an intermediary between heterogeneous and distributed data sources and the client. Because clients never need to "roll back" to earlier versions of the data, the snapshot server does not maintain any change history. Version numbers are also not required by the present invention, though they can be used. The digests submitted by the requesting client enable the snapshot server to compute the difference between the client's copy of the data and the current source data. No state is maintained at the server.

There is no intermediary comparable to the snapshot server in the present invention, and there are no snapshots in the prior art as in present invention for computing the sets of added, deleted, or modified bundles on the bundle server. The present invention differs from tightly-integrated client/server systems like LOTUS NOTES® in several ways. For example, a snapshot server does not need to coordinate versioning or updating with host servers. This loose coordination means that host servers do not have to support versioning and that they do not have to be aware of the consistency requirements of clients. In addition, an inventory delta in present protocol has no analog in tightly-integrated client/server systems. The inventory delta provides a complete inventory of changes that have occurred since the client's last snapshot, which allows clients to inspect changes before they are accepted.

Unlike distributed server systems, the present invention does not require close coordination among servers, and this allows a snapshot server to access a wide variety of host servers using any published protocol. For instance, a snapshot server can use HTTP, FTP or Java RMI protocols to read data from host servers and make that data available to its clients. Using the present invention, clients can determine exactly what updates they receive and when they receive them, which is a capability not provided in distributed server systems with automatic replication.

In the present invention, digests act as specialized cookies that include versioning information. The present invention differs from web browser cookies in that it provides a protocol for supporting static snapshots of server data; it allows client programs to choose when to update their snapshots; it provides an inventory delta that describes the differences between snapshots; and it permits data to be versioned even if that data resides on servers that do not explicitly support versioning.

A system and method of the present invention for providing a consistent view of data stored on host servers, which can change dynamically in an uncoordinated way, includes a client program and a snapshot server program. The snapshot server program permits one or more client programs to request snapshots of data from the snapshot server program such that the data included in or referenced by a snapshot originates from one or more host server programs and the data is accessible to the snapshot server program, but is managed independently of the snapshot server program.

A system and method for providing a consistent view of data stored therein, which can change dynamically in an uncoordinated way includes a snapshot server program that permits one or more client programs to request snapshots of data from the snapshot server program. The snapshot server program responds to a request by providing a digest with each snapshot created by the snapshot server program. The digest includes information that describes a version of each datum included in or referenced by the snapshot associated with the digest. A snapshot inventory delta is created by the snapshot server program using the snapshot digest. The snapshot inventory delta describes what data has changed since the snapshot associated with the digest was created, and classifies each such change as either an insertion, a deletion or an update, and associates the snapshot inventory delta with the digest and with the digest's associated snapshot.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides systems and methods by which one or more client programs can acquire consistent, static snapshots of dynamic, heterogeneously-managed data that are exported by one or more server programs, and acquire all data changes that have occurred since the creation of those snapshots through the use of snapshot-specific digests.

There currently exist many techniques to distribute data, replicate data, or to synchronize databases, but these techniques either require a tight integration of code that runs at each replication site or they require strict consistency between replicas. The present invention permits programs that manage distributed data to be loosely coupled or even unaware of each other. The present invention also relaxes the requirement for data consistency across a distributed system by allowing the data viewed by different clients to be consistent within themselves, but independent of each other. This weaker notion of consistency is appropriate in heterogeneously-managed networks like the Internet.

Figure 1:
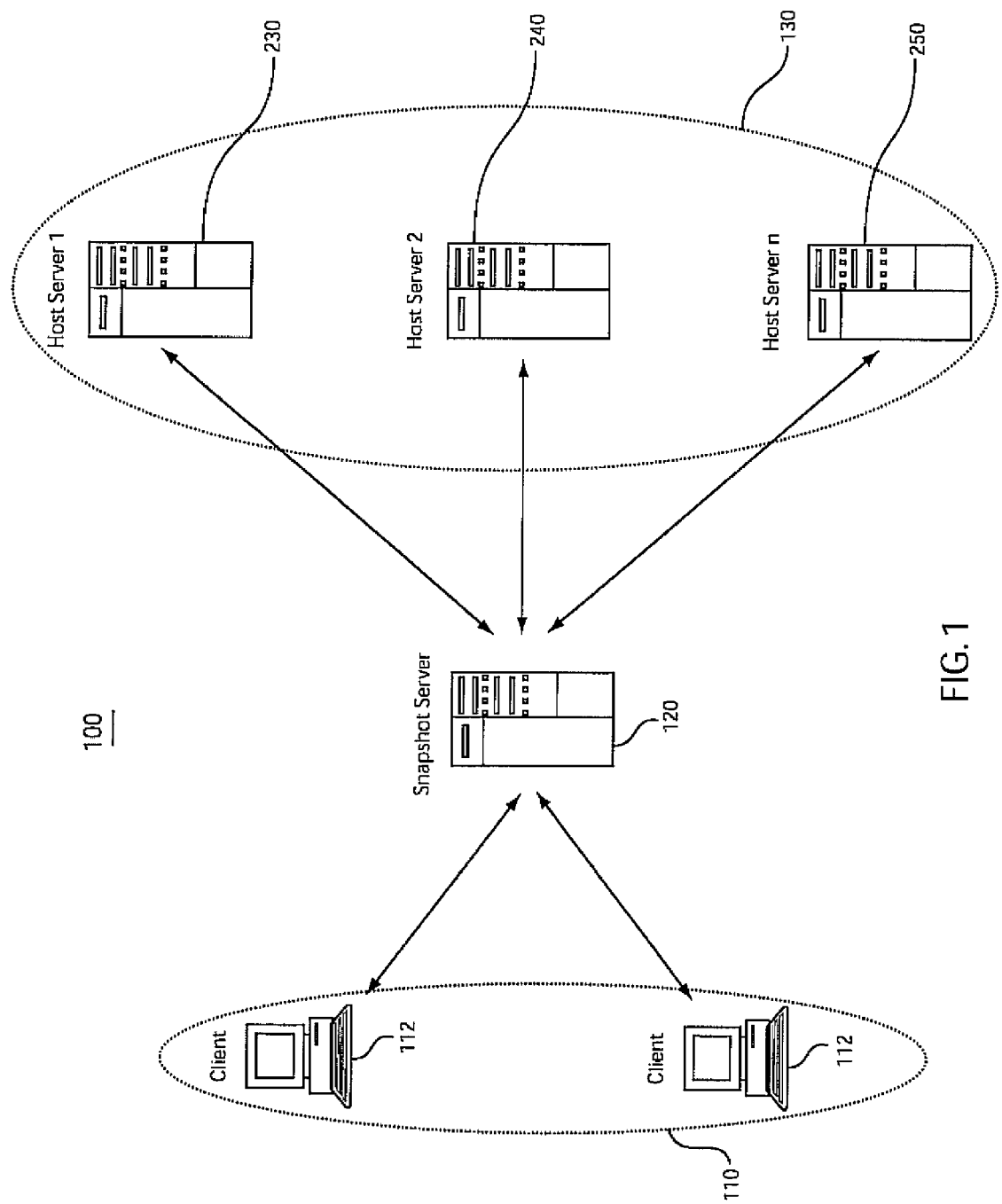
FIG. 1 is a block diagram showing client(s), a snapshot server and host server programs on a network in accordance with exemplary embodiments.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, a set of entities 100 are shown that include a set of client programs 110, a snapshot server 120, and a set of host servers 130. These entities 100 may be arbitrarily distributed across a set of nodes in a network or, they may be collocated on a single node. Host servers 1–n (230-250 or collectively servers 130) store data items. These data items may change over time. A client(s) 112 accesses a version of the data items via the snapshot server 120.

The snapshot server 120 communicates with one or more host servers 130 using any mutually acceptable communication protocol. The snapshot server 120 often caches data items that originate on host servers 130. This cached data can be preprocessed by the snapshot server 120 so that the data items can be efficiently transmitted and efficiently used by clients 112. The snapshot server 120 identifies each data item by a unique key (not shown). When a client 112 requests a snapshot of data from the snapshot server 120, the snapshot server 120 computes a digest over the data by computing a signature for each datum. The snapshot server 120 then returns the snapshot and the snapshot digest to the client 112.

The client 112 can query returned snapshots for the list of data keys that the snapshot(s) includes. In addition, clients 112 can access a particular data item in the snapshot by using is the data item's key.

Figure 2:
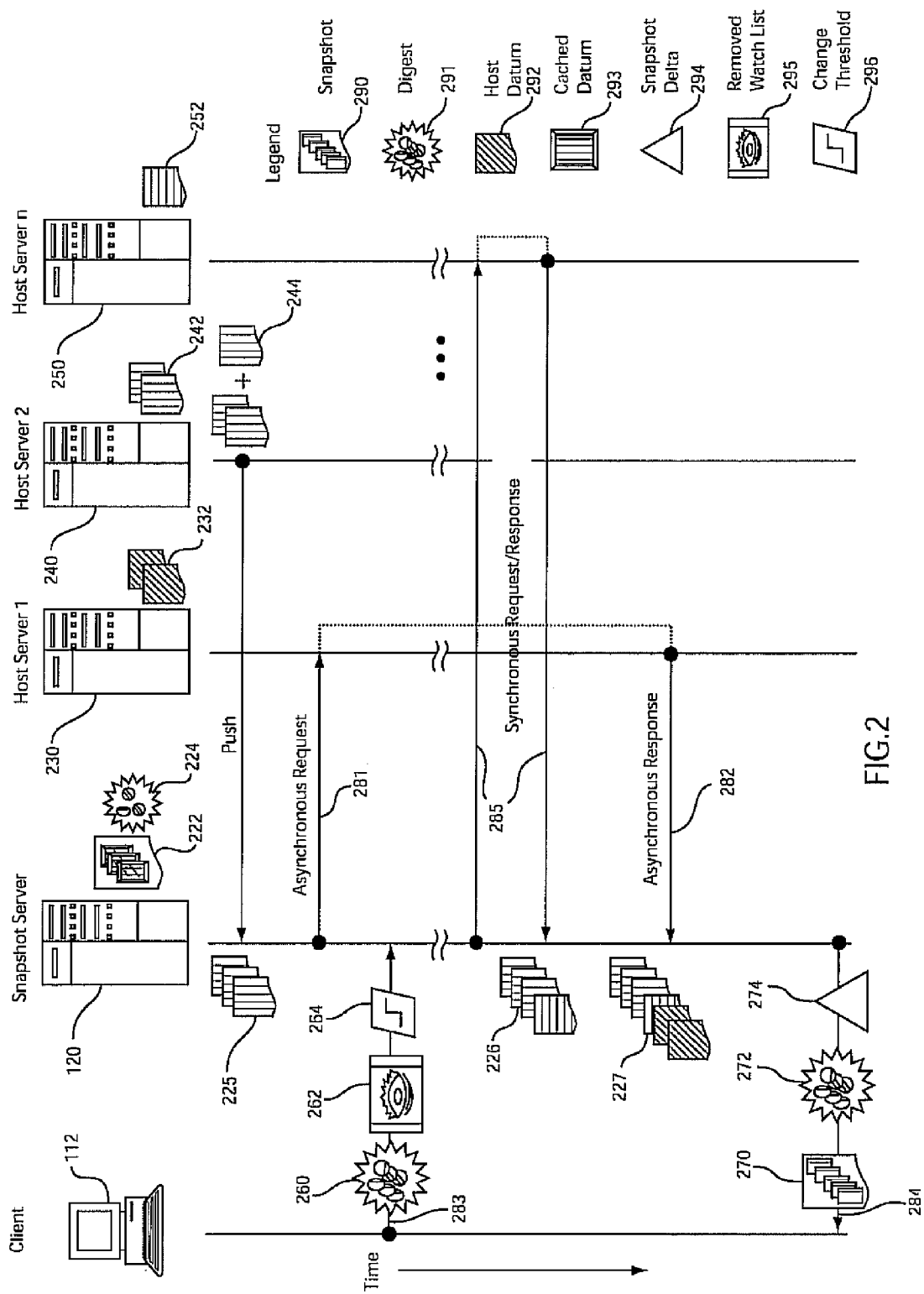
FIG. 2 is a diagram giving an overview of protocol exchanges between client, snapshot server and host servers in accordance with exemplary embodiments.

Referring to FIG. 2, an overview of protocol exchanges between a client 112, a snapshot server 120 and several host servers 230, 240 and 250 (which are equivalent to host servers 130 in FIG. 1) is shown. FIG. 2 illustrates which parties communicate and what messages they exchange in accordance with an exemplary embodiment of the present invention. The Legend describes the symbols that are used in FIG. 2 and in subsequent FIGs. to simplify the understanding of the embodiments. The symbols in the Legend include a snapshot 290, a digest 291, a host datum 292, a snapshot server cached datum 293, a snapshot inventory delta 294, a removed watch list 295 and a change threshold specification 296.

In FIG. 2, time progresses from the top of FIG. 2 to the bottom. Initially, the snapshot server 120 manages snapshot 222 and its associated digest 224. Host server 1 230 includes two data items 232; host server 2 240 includes two data items 242; and host server n includes a single data item 252. The first event in time order in FIG. 2 is the creation of new data item, 244, on host server 2 240. This creation event triggers a push transaction, 280, from host server 2 240 to the snapshot server 120. This push protocol allows host server 2 240 to automatically initiate the transmission of updates to the snapshot server 120. After the push transaction 280, the snapshot server has access to all data 225 from host server 2 240.

The second event in time order in FIG. 2 is the initiation by the snapshot server 120 of asynchronous transaction 281 with host server 1 230. When this transaction completes, with response 282, the snapshot server 120 will have received all data updates from host server 2 240. The third event in time order in FIG. 2 is the initiation by the client 112 of a new snapshot request 283 with the snapshot server 120. The parameters of this request include digest 260, removed watch list 262 and a change threshold 264. When the snapshot server 120 receives the client request 283, the snapshot server 120 initiates a synchronous transaction 285 with host server n 250 to retrieve any updates that may exist on that host server 250. After the synchronous transaction completes 285, the snapshot server has access to data 226, which includes data that originated on host server 2 240 and on host server n 250.

The fourth event in time order in FIG. 2 is the completion of asynchronous request 281 with response 282. After the asynchronous response completes, the snapshot server 120 has access to data 227, which includes data that originated on host server 1 230, host server 2 240 and host server n 250.

The fifth event in time order in FIG. 2 is the sending of response 284 from the snapshot server 120 to the client 112 to complete client request 283. This response includes snapshot 270, associated digest 272 and associated snapshot inventory delta 274.

Figure 3:
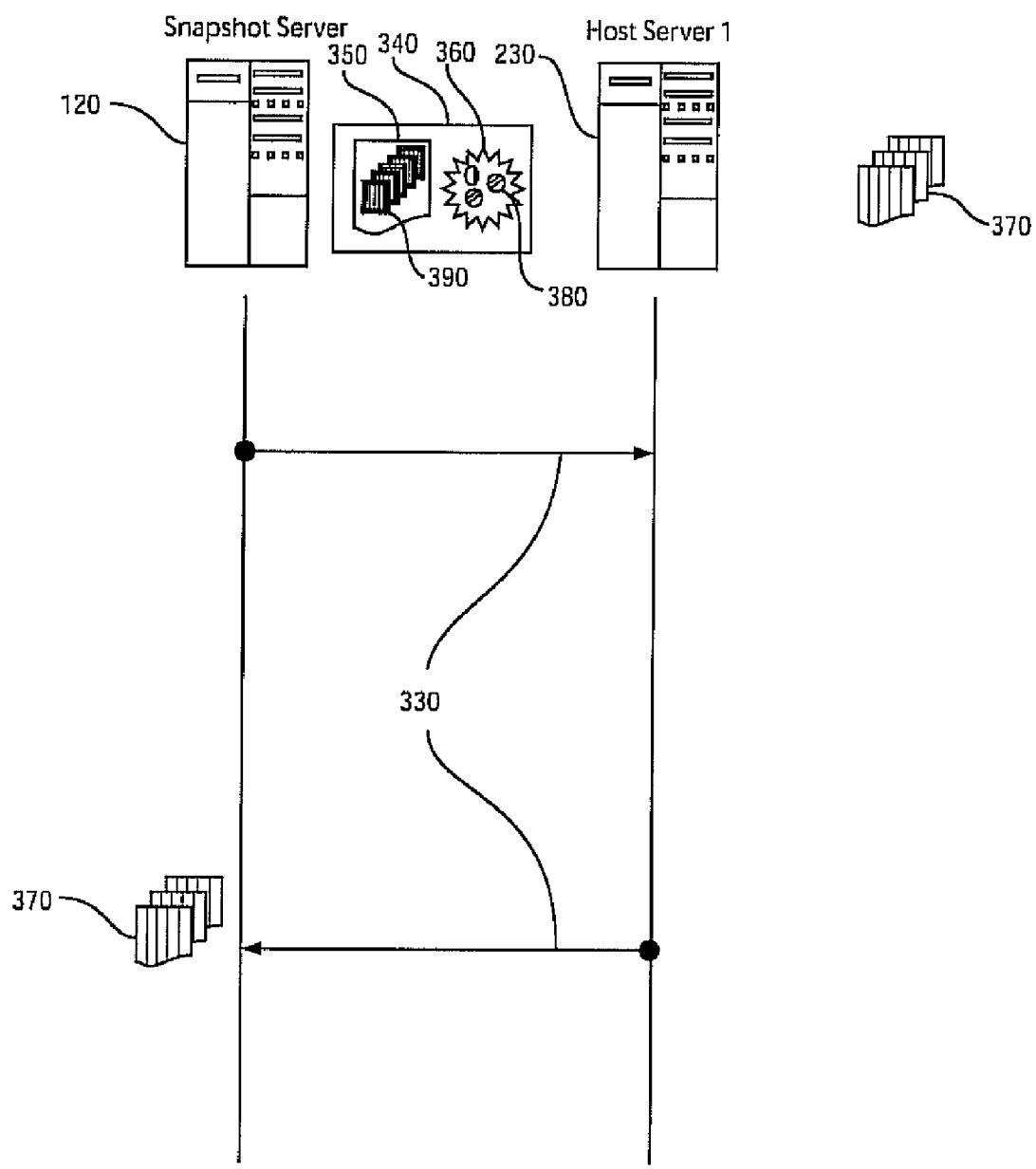
FIG. 3 is a diagram showing a snapshot server and host server protocol in accordance with an exemplary embodiment.

Referring to FIG. 3, data exchange between a snapshot server 120 and a host server 230 is illustratively described in greater detail. The snapshot server 120 communicates with the host server 230 via some underlying protocol 330, which can be any protocol that a snapshot server and a host server agree to use. Data items 370 that originate on the host server 230 are accessible to the snapshot server 120 using such a communication protocol. These communication protocols include, but are not limited to, the synchronous protocol, the asynchronous protocol, and the push protocol used in FIG. 2 to describe data transfer between host servers (230-250) and the snapshot server (120).

The snapshot server 120 maintains an internal state 340 including a collection of cached data items 350 and a digest 360. The digest includes a set of signatures computed over the set of data items 370 accessible to the snapshot server 120. Each signature (e.g., 380) in the digest is associated with its corresponding cached data item (e.g., 390). The snapshot server internal state defines the current version of data available to is clients from the snapshot server. A preferred embodiment of a snapshot server 120 caches host server data that could change, but only caches references to host server data that could not change. Also, a preferred embodiment of a snapshot server 120 preprocesses cached data to improve the performance of client requests.

FIGS. 4 through 7 illustrate four protocol exchanges that can occur between the client 112 and the snapshot server 120. FIGS. 4-7 show the communication between the client 112 and the snapshot server 120 during a client request, though communication between the snapshot server 120 and host servers 230-250 can also occur during the client request as described with reference to FIGS. 2 and 3. In addition, implementations can support client request parameter combinations not illustrated in the FIGS. 4 through 7.

Figure 4:
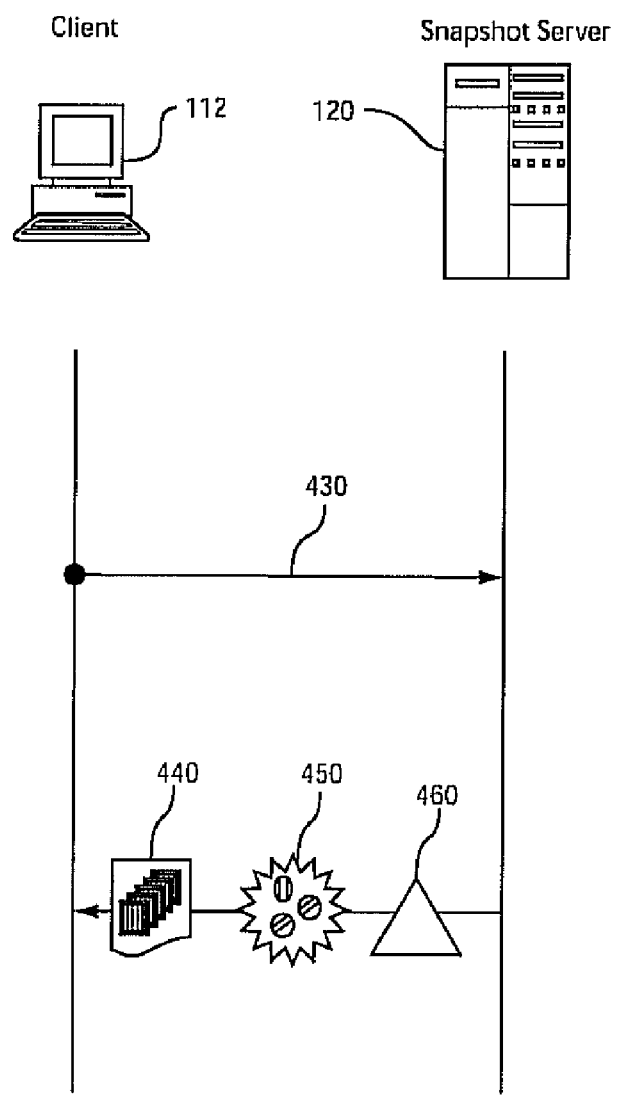
FIG. 4 is a diagram showing an illustrative client/snapshot server protocol with no parameters in accordance with and exemplary embodiment.

Referring to FIG. 4, a simple protocol exchange between the client 112 and the snapshot server 120. This exchange may be used for the initial handshake between client 112 and server 120 since the client has no prior snapshot and, hence, does not include any parameters (digest, watch list, or change threshold) in its request 430. When the snapshot server 120 receives request 430, the snapshot server 120 computes a new snapshot 440, its associated digest 450, and its associated inventory delta 460. The inventory delta 460 indicates all data items in the snapshot as being newly inserted.

Figure 5:
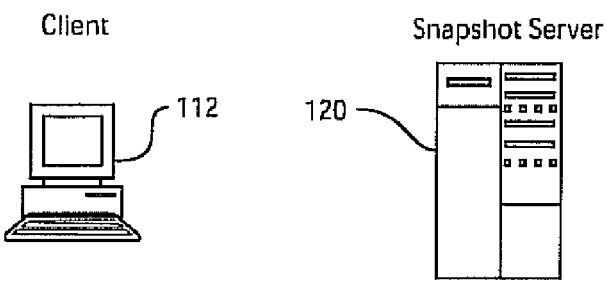
FIG. 5 is a diagram showing an illustrative client/snapshot server protocol with a digest in accordance with an exemplary embodiment.
Figure 5:
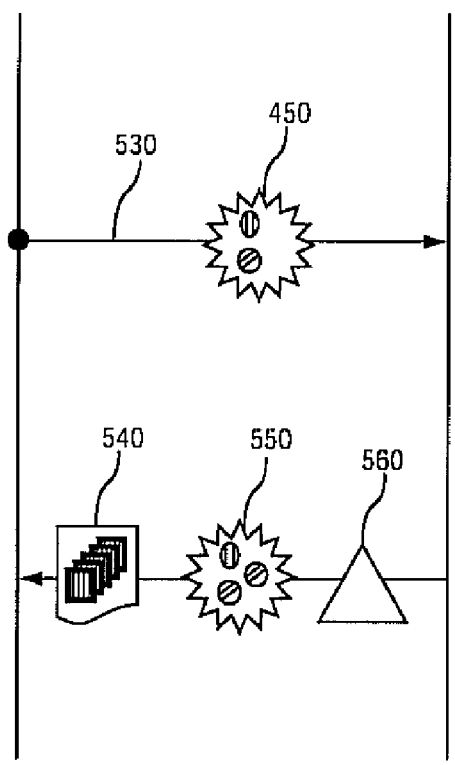

Referring to FIG. 5, another protocol exchange between the client 112 and the snapshot server 120 is illustratively depicted. This exchange may be used after the initial handshake described in FIG. 4. In this case, the client 112 has previously obtained a snapshot (e.g., 440) and the digest (e.g., 450) associated with that snapshot. When the client makes a request 530 for a new snapshot, the client sends the digest 450 associated with the previous snapshot to the snapshot server 120 as part of the request. When the snapshot server 120 receives this request, the snapshot server 120 computes a new snapshot 540, its associated digest 550, and its associated inventory delta 560. Using the previous snapshot digest 450, the snapshot server 120 precisely reflects in the inventory delta 560 which data items have been added, which data items have been modified or which data items have been removed since the client's previous snapshot was created.

Figure 6:
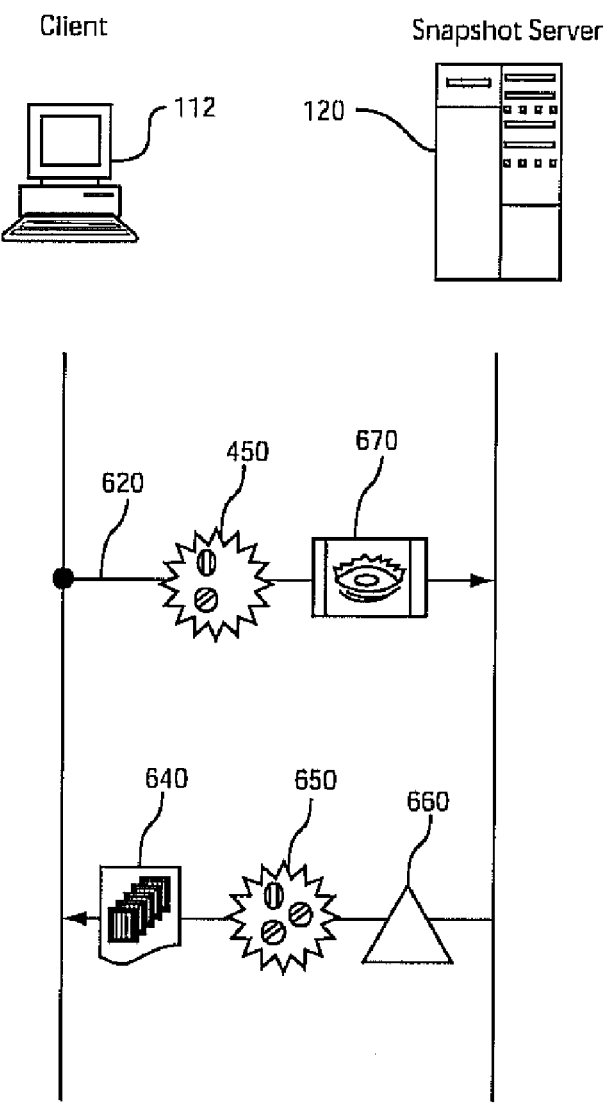
FIG. 6 is a diagram showing an illustrative client/snapshot server protocol with digest and removed watch list in accordance with another exemplary embodiment.

Referring to FIG. 6, yet another protocol exchange between the client 112 and the snapshot server 120 is illustratively depicted. This exchange may be used after the initial handshake described in FIG. 4. In this case, the client has previously obtained a snapshot (e.g., 440) and the digest (e.g., 450) associated with that snapshot. When the client makes a request 620 for a new snapshot, the client sends the digest 450 associated with the previous snapshot 440 (FIG. 4) to the snapshot server 120 as part of the request 620. The client also sends a removed watch list 670 as part of the request 620. When the snapshot server receives this request 620, the snapshot server 120 computes a new snapshot 640, its associated digest 650, and its associated inventory delta 660. Using the previous snapshot digest 450, the snapshot server 120 precisely reflects in the inventory delta 660 which data items have been added, which data items have been modified, or which data items have been removed since the client's previous snapshot 440 was created. In addition, the inventory delta 660 removed list will include only those data keys that were specified in the removed watch list 670.

Figure 7:
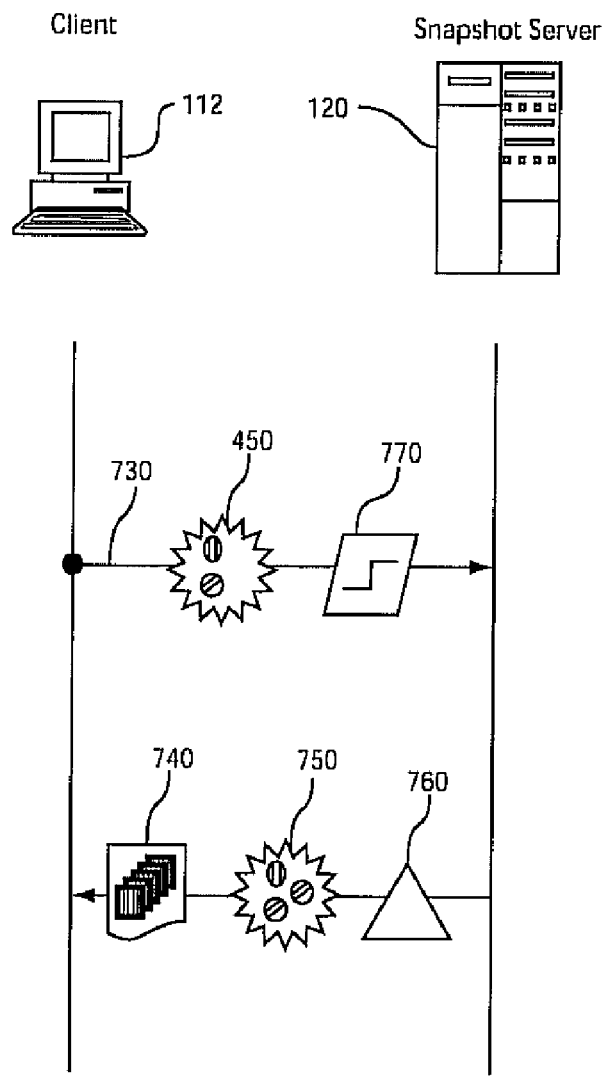
FIG. 7 is a diagram showing an illustrative client/snapshot server protocol with digest and change threshold in accordance with yet another exemplary embodiment.

Referring to FIG. 7, still another protocol exchange between the client 112 and the snapshot server 120 is illustratively depicted. This exchange may be used after the initial handshake described with reference to FIG. 4. In this case, the client 112 has previously obtained a snapshot (e.g., 440 in FIG. 4) and the digest (e.g., 450) associated with that snapshot. When the client 112 makes a request 730 for a new snapshot, the client 112 sends the digest 450 associated with is the previous snapshot to the snapshot server 120 as part of the request. The client 112 also sends a change threshold 770 as part of the request. When the snapshot server 120 receives this request 730, the snapshot server 120 determines whether the change threshold 770 specified by the client 112 has been reached. If the change threshold 770 has not been reached, then the snapshot server 120 returns to the client 112 an indication that the threshold has not been reached. Otherwise, normal processing occurs in which the snapshot server computes a new snapshot 740, its associated digest 750, and its associated inventory delta 760. Using the previous snapshot digest 450, the snapshot server 120 precisely reflects in the inventory delta 760 which data items have been added, which data items have been modified or which data items have been removed since the client's previous snapshot was created.

In one embodiment, change thresholds (e.g., 770) permit change threshold parameters to be defined in terms of the total number of insertions, updates and deletions since the snapshot associated with digest 450 was created. Another embodiment of change thresholds includes change threshold parameters to be defined in terms of the number of insertions, the number of updates, and the number of deletions since the snapshot associated with digest 450 was created. Another embodiment of change thresholds includes change threshold parameters to be defined in terms of the recentness of insertions, updates and deletions since the snapshot associated with digest 450 was created. Other threshold parameters are also contemplated.

Figure 8:
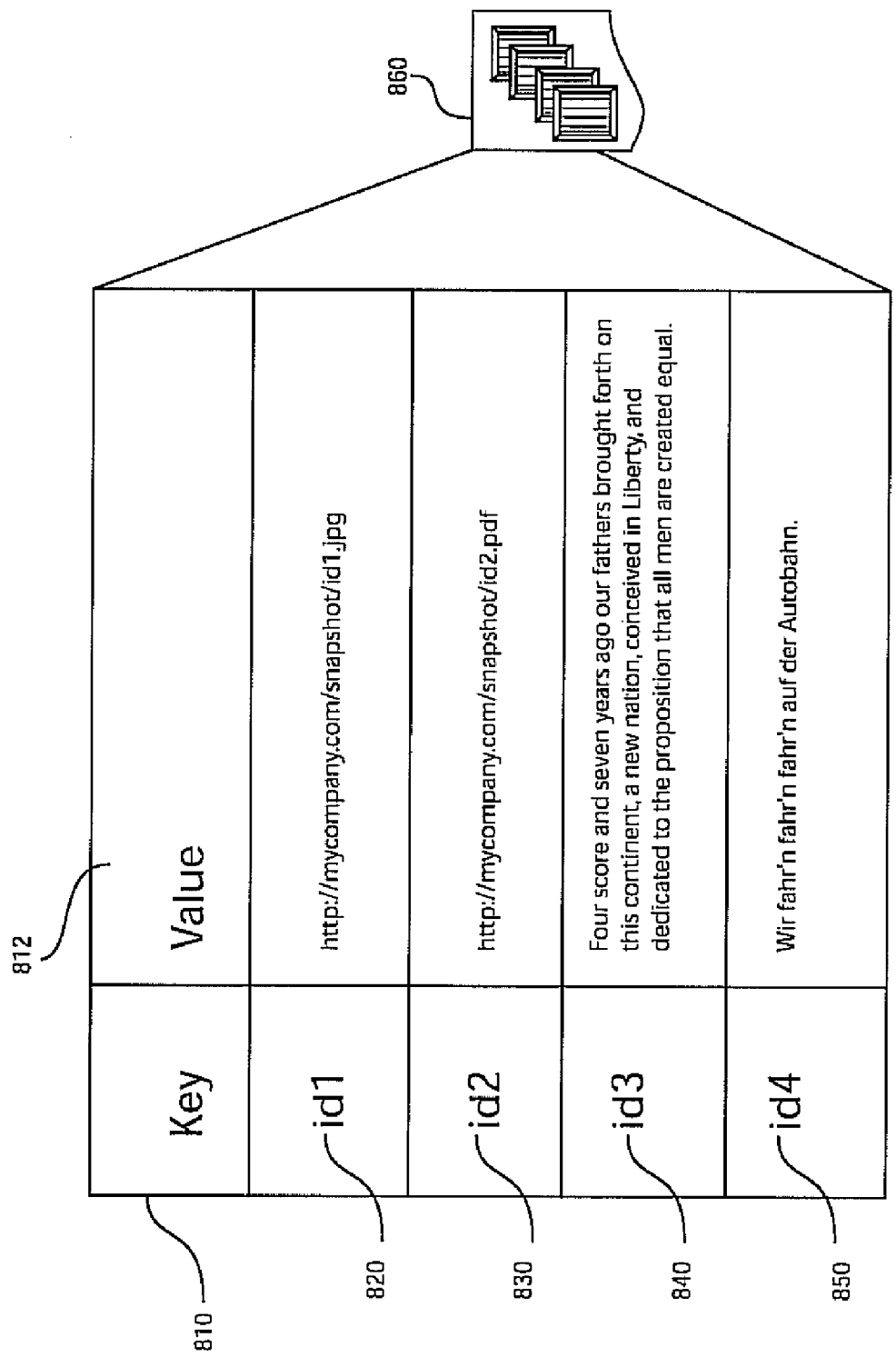
FIG. 8 is a high-level representation of snapshot contents in accordance with an exemplary embodiment.

Referring to FIG. 8, an exploded view of an iconic snapshot 860 is illustratively shown. One function of a snapshot 860 is to provide access to key/value pairs where keys 810 are unique and values 812 associated with each key are either included in the snapshot or referenced by the snapshot. In either case, these values are guaranteed not to change during the lifetime of the snapshot 860. FIG. 8 indicates the words "key" and "value" for clarity, which may be meta information and may not actually be part of the snapshot content.

The example snapshot 860 shown FIG. 8 includes four key/value pairs (e.g., 820, 830, 840 and 850). Pair 820 shows key id1, which uses the URL http://mycompany.com/snapshot/id1.jpg to refer to its value. Pair 830 shows key id2, which uses the URL http://mycompany.com/snapshot/id2.pdf to refer to its value. The snapshot server 120 (FIG. 1) guarantees that the data referenced by both these URLs will not change during the lifetime of the snapshot. Pairs 830 and 840 show keys id3 and id4, respectively. The values associated with both of these is keys are included in the snapshot 860.

Snapshot 860 can provide access to key/value pairs using any API chosen. In one embodiment, a snapshot implements a getKeys( ) method, which returns the collection of unique keys included in the snapshot, and a getValue (key) method, which returns the value of the key specified in the input parameter. One important characteristic of this embodiment is that the snapshot manages the location of its value data in a manner that is transparent to any code that uses the snapshot. In addition, snapshot implementations can maintain descriptive data that permits the efficient retrieval and storage of value data.

Figure 9:
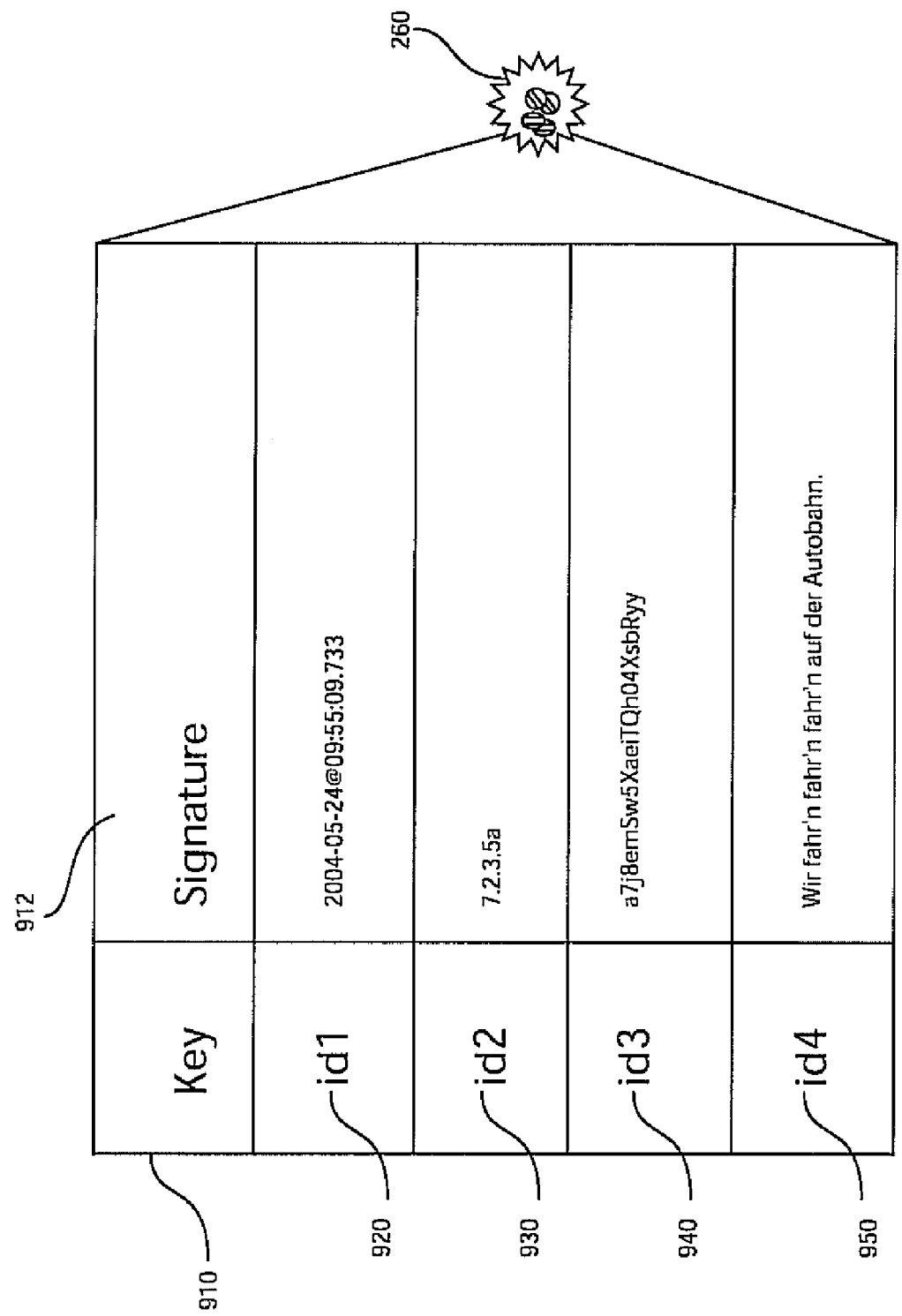
FIG. 9 is a high-level representation of digest contents in accordance with an exemplary embodiment.

Referring to FIG. 9, a high-level representation of the contents of an example snapshot digest 960 is illustratively shown. An exploded view of the iconic snapshot digest 960 provides version information for each key/value pair in the snapshot 860 associated with the digest 960. FIG. 9 indicates the words "key" and "signature" for clarity, which may be meta information and may not actually be part of the snapshot digest.

The example snapshot digest shown in FIG. 9 includes version information for the four key/value pairs defined in the snapshot 860 in FIG. 8. In the case shown, digest 960 includes keys 910 and signatures 912. Key/signature pair 920 specifies the version information for the key id1 as a timestamp. Pair 930 specifies the version information for the key id2 as a release number. Pair 940 specifies the version information for the key id3 as a hash of its value. Pair 950 specifies the version information for the key id4 as the value itself. In general, a digest 960 can use any method or any plurality of methods to distinguish between different versions of snapshot data.

One embodiment of a snapshot digest packages the digest with its associated snapshot. In this embodiment, the snapshot provides a method, getDigest( ), that allows the digest to be retrieved. This retrieved digest is opaque to all code outside of the snapshot server, though the digest can be serialized to disk and deserialized from disk by any code that has access to the digest.

Figure 10:
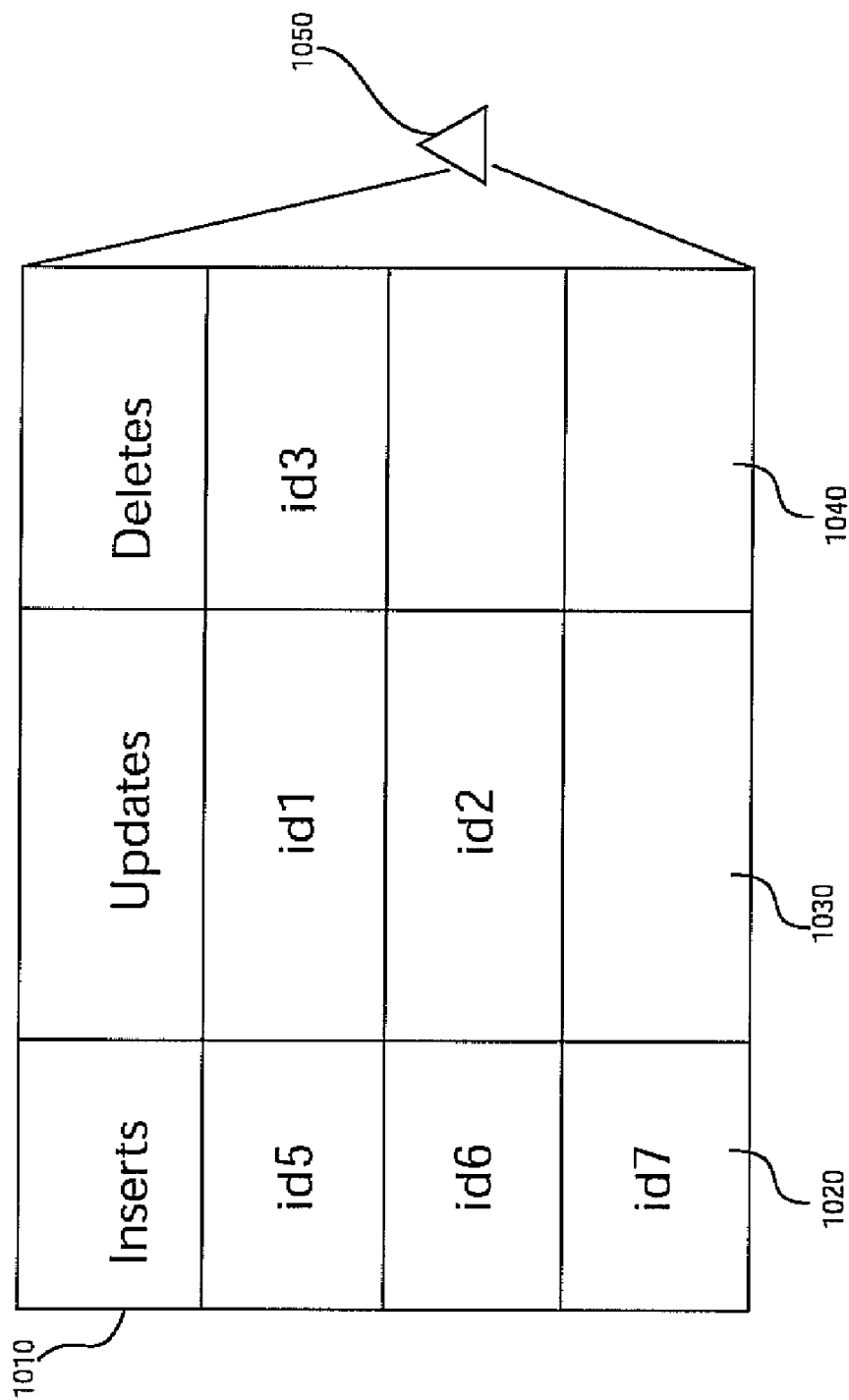
FIG. 10 is a high-level representation of inventory delta contents in accordance with an exemplary embodiment.

Referring to FIG. 10, a high-level representation of the contents of an example snapshot inventory delta 1050 is illustratively shown. An exploded view of the iconic snapshot inventory delta 1050 shows that the inventory delta characterizes the changes in the snapshot associated with the inventory delta with regard to some previously retrieved snapshot. FIG. 10 indicates the words "inserts", "updates" and "deletes" for clarity, which may be meta information and may not actually be part of the delta inventory.

The example snapshot inventory delta object 1050 shown in FIG. 10 includes three lists in which the elements in the lists are snapshot keys. List 1020 is a list of inserted keys; list 1030 is the list of updated keys; and list 1040 is a list of deleted keys.

To better understand the function of snapshot inventory deltas, assume that a client has retrieved a snapshot, snapshot1, and its associated digest, digest1, at some point in time. At some subsequent point in time, the client requests a new snapshot and passes digest1 as an input parameter on this request. The reply to this latter request includes a new snapshot, snapshot2, a new digest, digest2, and an inventory delta, delta2. This delta2 object describes (1) all new key/value pairs that have been inserted into snapshot2 since snapshot1 was created, (2) all key/value pairs that have been modified in snapshot2 since snapshot1 was created, and (3) all key/value pairs that have been deleted from snapshot2 since snapshot1 was created.

Using FIG. 10 and the example from the preceding paragraph, list 1020 includes three new keys (id5, id6, and id7) that were inserted into snapshot2 since snapshot1 was created. List 1030 includes two keys (id1 and id2) whose values have changed since snapshot1 was created. In addition, 1040 includes one key (id3) that was deleted along with its value from since snapshot1 was created.

Figure 11:
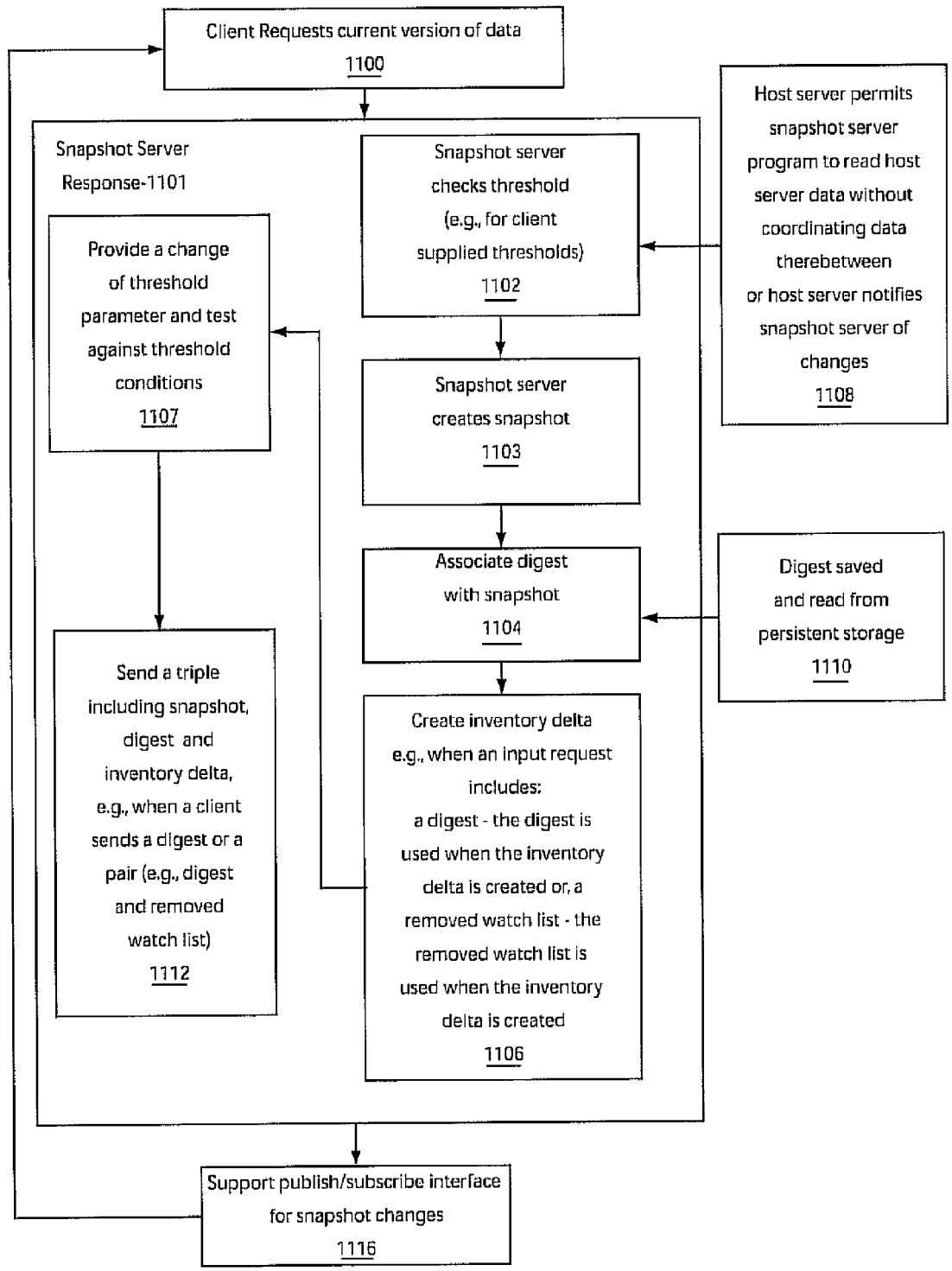
FIG. 11 is a block/flow diagram showing a system/method for providing consistent snapshots of dynamic heterogeneously managed data in accordance with exemplary embodiments.

Referring to FIG. 11, a block/flow diagram is shown for a system/method for requesting snapshots of data from a snapshot server program. In block 1100, the client makes a request for a snapshot. The snapshot server program may respond in block 1101 in a plurality of ways.

In block 1102, a snapshot server checks to determine in a threshold has been met. If the threshold has been met then the program path continues with block 1103. This threshold type may include a client-supplied threshold such that a snapshot is taken if the threshold has been met otherwise a snapshot would not be taken. If this type of threshold is not employed block 1102 is skipped. In block 1103, a snapshot is created by a snapshot server program by calculating a current version of data, which is up-to-date to within a well-defined propagation delay. The data in or referenced by the snapshot is in a consistent state and unchanged after the snapshot is created.

In block 1104, a snapshot digest is associated with each snapshot created such that the snapshot digest includes information that describes the version of each datum included in or referenced by the snapshot associated therewith.

In block 1106, using the snapshot digest, a snapshot inventory delta, which describes what data has changed since the snapshot associated with the digest was created, is created and classifies each such change as an insertion, a deletion or an update, and associates the inventory delta with said digest and with said digest's associated snapshot. If the client sends a digest as an input in a request, then this input digest is used when the inventory delta is created in subsequent steps. If the client sends a removed watch list as an input in a request, then this input list is also used when the inventory delta is created in subsequent steps.

In block 1107, a change threshold parameter may be provided, which is sent with the digest to the snapshot server program such that the snapshot server program responds with a triple (e.g., snapshot, digest and inventory delta) only if an amount of change in the snapshot server program's data since the snapshot associated with the digest was created exceeds a threshold. The amount of change of the threshold may include, for example, a number of insertions, deletions and updates. Note that this type of threshold is checked after the delta has been created as opposed to the threshold type checked before the snapshot is created (see block 1102).

The data included in or referenced by a snapshot may originate from one or more host server programs such that the is data is accessible to the snapshot server program, but that the data is managed independently of the snapshot server program. The snapshot may include some or all of the data described in the digest associated with the snapshot or include references to some or all of the data described in the digest associated with said snapshot. The referenced data may reside on a host server.

In block 1108, a host server program may permit the snapshot server program to read the host server program's data, but that the host server program may or may not coordinate changes to the host server program's data with the snapshot server program, or, alternately, the host server program may permit the snapshot server program to read the host server program's data, and the host server program notifies the snapshot server program of changes to the host server program's data.

In block 1110, the snapshot digests may be saved to and read from persistent storage, and the snapshot digests may be exchanged between programs. Note that clients may also save digests to persistent storage.

Other responses to requests may include the following under given conditions. In block 1112, a triple is sent to the client including a snapshot, digest and inventory delta. For example, if the client program sends a snapshot digest to the snapshot server program, the snapshot server program responds by sending to the client program a triple that includes a snapshot of the current version of the server program's data, the snapshot's associated digest and the snapshot's associated inventory delta.

If the client program sends a pair that includes the snapshot digest and a removed watch list to the snapshot server program, the snapshot server program responds by sending to the client program a triple that includes a snapshot of the current version of said server program's data, the snapshot's associated digest and the snapshot's associated inventory delta such that only data that appears in the removed watch list is described as removed in the inventory delta.

In block 1116, the snapshot server program may support a publish/subscribe interface that permits client programs to be notified when the current version of said snapshot server program's data has changed.

Having described preferred embodiments for consistent snapshots of dynamic heterogeneously managed data (which are intended to be illustrative and not limiting), it is noted that modifications and variations can be made by persons skilled in the art in light of the above teachings. It is therefore to be understood that changes may be made in the particular embodiments of the invention disclosed which are within the is scope and spirit of the invention as outlined by the appended claims. Having thus described the invention with the details and particularity required by the patent laws, what is claimed and desired protected by Letters Patent is set forth in the appended claims.

What is claimed is:

1. A method for requesting snapshots of data from a snapshot server program, comprising the steps of:
   creating a snapshot by calculating a current version of data, which is up-to-date to within a well-defined propagation delay, the data in or referenced by the snapshot being in a consistent state and unchanged after the snapshot is created;
   associating a snapshot digest with each snapshot created such that the snapshot digest includes information that describes the version of each datum included in or referenced by the snapshot associated therewith; and
   using the snapshot digest, creating a snapshot inventory delta, which describes what data has changed since the snapshot associated with the digest was created, classifies each such change as either an insertion, a deletion or an update, and associates said inventory delta with said digest and with said digest's associated snapshot.

2. The method as recited in claim 1, wherein the data included in or referenced by a snapshot originates from one or more host server programs such that the data is accessible to the snapshot server program, but that the data is managed independently of the snapshot server program.

3. The method as recited in claim 1, wherein the snapshot includes some of the data described in the digest associated with the snapshot.

4. The method as recited in claim 1, wherein the snapshot includes references to some of the data described in the digest associated with said snapshot and the referenced data resides on the snapshot server program or a host server.

5. The method as recited in claim 1, further comprising the step of a host server program permitting the snapshot server program to read the host server program's data, but that the host server program does not coordinate changes to the host server program's data with the snapshot server program.

6. The method as recited in claim 1, further comprising the step of a host server program permitting the snapshot server program to read the host server program's data and that the host server program notifies the snapshot server program of changes to the host server program's data.

7. The method as recited in claim 1, further comprising the step of saving and reading the snapshot digests to and from persistent storage.

8. The method as recited in claim 1, further comprising the step of exchanging snapshot digests between programs.

9. The method as recited in claim 1, further comprising the step of sending, from the client program, a snapshot digest to the snapshot server program and the snapshot server program responding by sending to the client program a triple that includes a snapshot of the current version of the server program's data, the snapshot's associated digest and the snapshot's associated inventory delta.

10. The method as recited in claim 9, further comprising the step of providing a change threshold parameter, which is sent with the digest to the snapshot server program such that the snapshot server program responds with the triple only if an amount of change in the snapshot server program's data since the snapshot associated with the digest was created exceeds a threshold.

11. The method as recited in claim 1, wherein the amount of change of the threshold includes a number of insertions, deletions and updates.

12. The method as recited in claim 1, further comprising the step of associating the snapshot digest sent by the client program with a snapshot being used by the client program.

13. The method as recited in claim 1, further comprising the step of describing all data in the inventory delta's associated snapshot as being new when the snapshot digest sent by the client program is null or empty.

14. The method as recited in claim 1, further comprising the step of sending a pair from the client program that includes the snapshot digest and a removed watch list to the snapshot server program and the snapshot server program responds by sending to the client program a triple that includes a snapshot of the current version of said server program's data, the snapshot's associated digest and the snapshot's associated inventory delta such that only data that appears in the removed watch list is described as removed in the inventory delta.

15. The method as recited in claim 1, further comprising the step of the snapshot server program supporting a publish/subscribe interface that permits client programs to be notified when the current version of said snapshot server program's data has changed.

16. A non-transient program storage device readable by machine, tangibly embodying a program of instructions executable by the machine to perform method steps for requesting snapshots of data from a snapshot server program, as recited in claim 1.

* * * * *